United States Patent [19]
Shinjo et al.

[11] Patent Number: 5,269,022
[45] Date of Patent: Dec. 7, 1993

[54] METHOD AND APPARATUS FOR BOOTING A COMPUTER SYSTEM BY RESTORING THE MAIN MEMORY FROM A BACKUP MEMORY

[75] Inventors: Kazuya Shinjo; Eiji Ishibashi, both of Tokyo, Japan

[73] Assignee: Kabushiki Kaisha Toshiba, Kawasaki, Japan

[21] Appl. No.: 673,394

[22] Filed: Mar. 22, 1991

[30] Foreign Application Priority Data

Mar. 28, 1990 [JP] Japan .................................. 2-76605

[51] Int. Cl.⁵ .............................................. G06F 9/24
[52] U.S. Cl. ............................. 395/700; 364/DIG. 1; 364/280.2; 364/280; 364/247.3; 364/247
[58] Field of Search .............................. 395/700, 575

[56] References Cited

U.S. PATENT DOCUMENTS

| | | | |
|---|---|---|---|
| 4,430,704 | 2/1984 | Page et al. | 395/700 |
| 4,663,707 | 5/1987 | Dawson | 395/700 |
| 4,720,812 | 1/1988 | Kao et al. | 395/700 |
| 5,155,833 | 9/1992 | Cullison et al. | 395/425 |

*Primary Examiner*—Kevin A. Kriess
*Attorney, Agent, or Firm*—Oblon, Spivak, McClelland, Maier & Neustadt

[57] ABSTRACT

In a computer system, when the system is first booted in a normal mode, main memory data stored in a main memory immediately after the system is booted, is stored as backup data in a backup memory or the like. A backup flag representing whether or not the backup data can be restored is set and the system is rebooted. When the system is next booted in the normal mode, the backup data stored in the backup memory or the like is restored as the main memory data in the main memory. The backup flag is automatically reset in a maintenance mode.

13 Claims, 3 Drawing Sheets

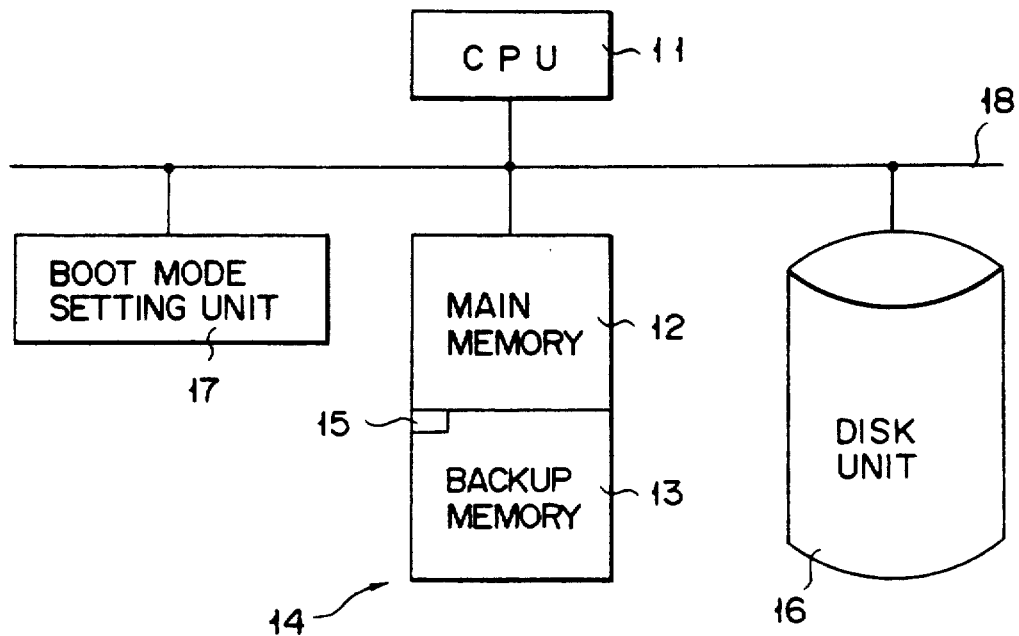
F I G. 1
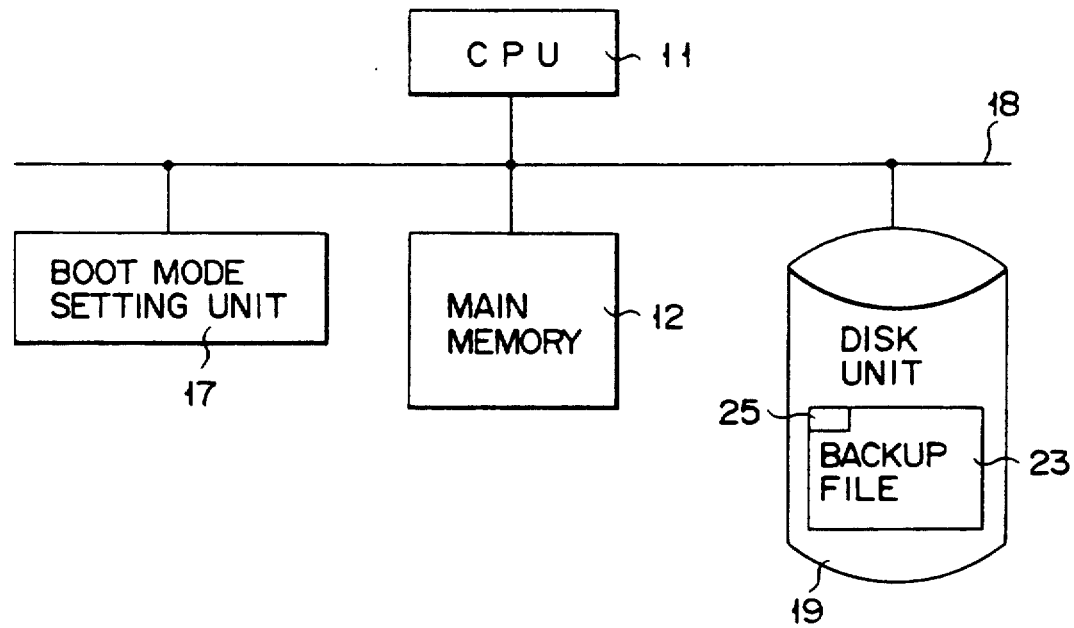
F I G. 3

5,269,022

METHOD AND APPARATUS FOR BOOTING A COMPUTER SYSTEM BY RESTORING THE MAIN MEMORY FROM A BACKUP MEMORY

BACKGROUND OF THE INVENTION

1. Field of the Invention

The present invention relates to a method and an apparatus for booting a computer system.

2. Description of the Related Art

In a computer system, generally, whenever the system is booted, a boot process for loading firmware, an initial program loader (IPL) program and an initialize (INZ) program, an initial program loader process, and an initialization process are executed.

In the initialization process, a resident load module is loaded into a main memory, various control blocks are produced, the running environment of an operating system (OS) is set, and the running environment of an application system is set (for example, a control process is produced).

The above-described process requires long time since the number of times of access to a recording medium such as a disk is very large and an overhead for retrieval of file, production of process or the like is increased. In other words, boot time required until an operation as a computer system starts, is lengthened.

It is thus desirable to achieve an apparatus capable of booting a computer system at high speed.

SUMMARY OF THE INVENTION

It is an object of the present invention to provide a method and an apparatus for booting a computer system.

According to one aspect of the present invention, there is provided a method for booting a computer system, the method comprising the steps of: setting a boot mode for booting the computer system; determining whether or not the set boot mode is a normal mode; determining whether or not a flag is set when the boot mode is the normal mode, the flag representing whether or not backup data is restorable; storing main memory data to be stored in a main memory immediately after the computer system is booted, as the backup data, into a backup memory when the flag is reset; and restoring the backup data stored in the backup memory, as the main memory data, into the main memory when the flag is set.

According to another aspect of the present invention, there is provided an apparatus for booting a computer system, the apparatus comprising: a main memory for storing main memory data; means for setting a boot mode for booting the computer system; determining means for determining whether or not the boot mode is a normal mode; a flag to be set/reset in accordance with a determination result by the determining means; and a backup memory for storing the main memory data to be stored in the main memory immediately after the computer system is booted, as backup data when the boot mode is the normal mode and the flag is reset, and wherein the backup data stored in the backup memory is restored as the main memory data into the main memory when the boot mode is the normal mode and the flag is set.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing a system according to a first embodiment of the present invention;

FIG. 3 is a block diagram showing a system according to a second embodiment of the present invention.

DETAILED DESCRIPTION OF THE PREFERRED EMBODIMENTS

Figure 2:
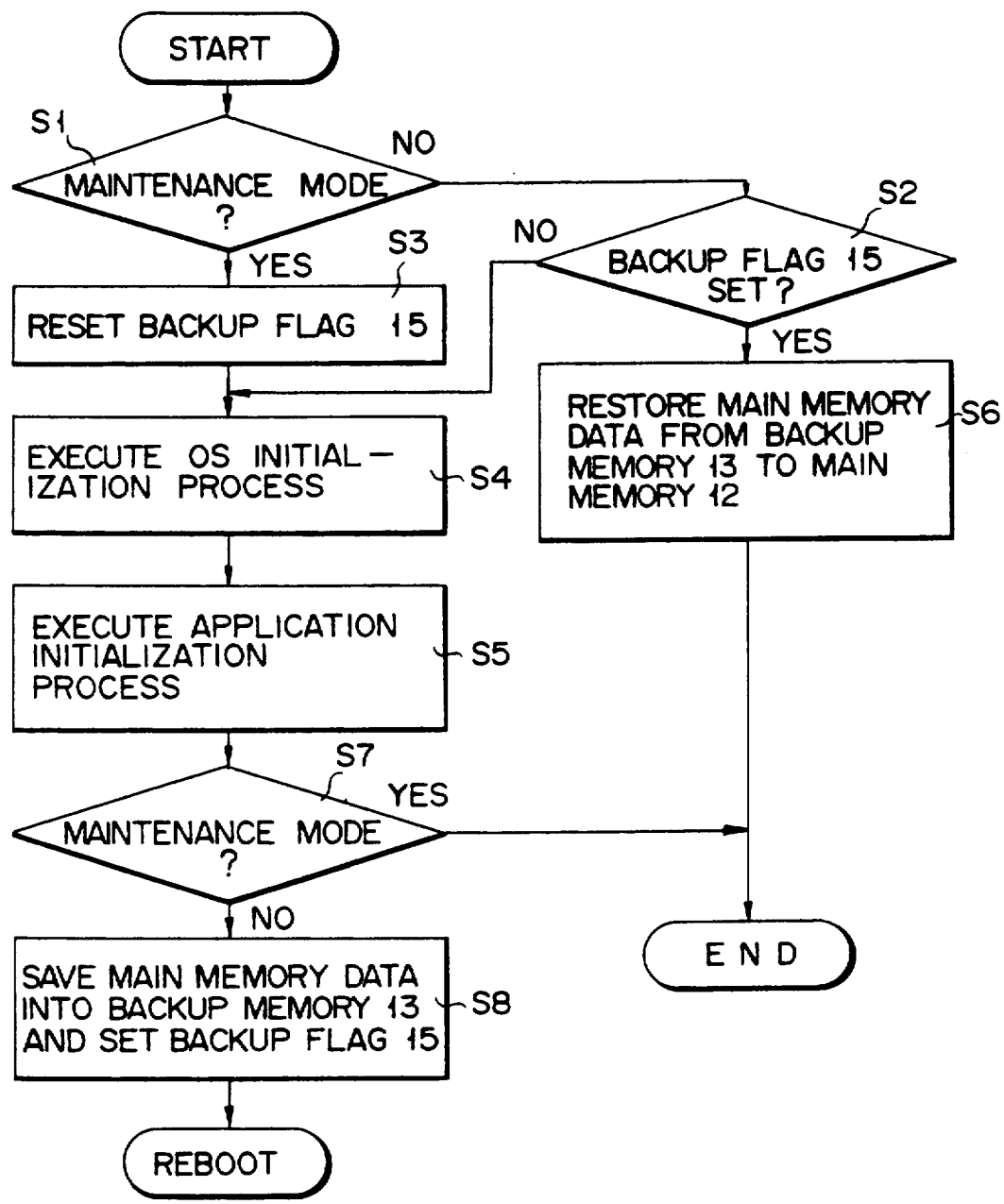
FIG. 2 is a flowchart showing the operation of the system according to the first embodiment.

Embodiments of the present invention will be described with reference to the accompanying drawings.

As illustrated in FIG. 1, a computer system according to the first embodiment of the present invention includes a central processing unit (CPU) 11, a memory 14, a disk unit 16, a boot mode setting unit 17 and a bus 18.

The CPU 11 controls the entire computer system.

The memory 14 includes a main memory 12 and a backup memory 13. The main memory 12 stores various programs and data as main memory data. The backup memory 13 stores the main memory data, which is stored in the main memory 12, as backup data. Since the backup memory 13 has approximately the same memory capacity as the main memory 12, the memory capacity of the memory 14 is about twice as large as that of the main memory 12.

The backup memory 13 includes a backup flag 15. The backup flag 15 is used to indicate whether or not the backup data stored in the backup memory 13 can be restored into the main memory 12 as the main memory data.

The disk unit 16 is constituted of, for example, a magnetic disk unit and stores various programs, data or the like which are to be booted.

The boot mode setting unit 17 is constituted of, for example, a service processor (SVP) and used to set a boot mode in the computer system. The boot mode includes a maintenance mode for software maintenance such as replacement of the programs and patch and a mode (normal mode) other than the maintenance mode. The normal mode includes a quick start mode in which a high speed boot can be executed using the backup data and a saving mode in which the main memory data stored in the main memory 12 is saved in the backup memory 13 as the backup data, immediately after a normal boot is executed. It depends upon the set/reset state of the backup flag 15 which of the quick start mode and the saving mode is selected. More specifically, in the normal mode, when the backup flag 15 is set, the quick start mode is selected and, when the backup flag 15 is reset, the saving mode is selected.

A boot process of the system according to the first embodiment will be described with reference to the flowchart shown in FIG. 2.

When a boot command is output from the boot mode setting unit 17 to the CPU 11, an operation using the initial program loader (IPL) program is started by the CPU 11.

In step S1, it is determined whether or not the boot mode designated by the boot command output from the boot mode setting unit 17 is the maintenance mode. If the boot mode is not the maintenance mode, i.e., if it is the normal mode, it is determined whether or not the backup flag 15 of the backup memory 13 is set (step S2). That is, it is determined whether a boot process is executed in the quick start mode or saving mode.

In step S2, when the backup flag 15 is reset, it is determined that the backup data stored in the backup memory 13 cannot be restored. Since this determination is made in the first boot process, the same boot process as a conventional one is executed. In other words, the operating system (OS) initialization process and the application initialization process are executed by the initialization program (steps S4 and S5).

After the application initialization process of step S5 is completed, it is determined again whether or not the boot mode designated by the boot command is the maintenance mode in step S7.

In step S7, when the designated boot mode is not the maintenance mode, i.e., when it is the normal mode, the saving mode is selected, and the main memory data stored in the main memory 12 is saved into the backup memory 13 as the backup data and the backup flag 15 of the backup memory 13 is set (step S8). The process of step S8 is completed and then a reboot is executed.

Since the backup flag 15 has been set, the boot process is started in the quick start mode through steps S1 and S2 after the reboot. That is, in step S6, the backup data stored in the backup memory 13 is restored into the main memory 12 as the main memory data. Since the computer system is thus restored to the state immediately after the boot process and the running environment is set, the boot process of the computer system can be completed without executing the OS initialization process of step S3 or the application initialization process of step S4.

The boot process in the maintenance mode will be next described.

When the boot command for designating the maintenance mode is output from the mode setting unit 17, in step S3, a process is executed not to restore the backup data stored in the backup memory 13 through the process of step S1. That is, the backup flag 15 of the backup memory 13 is reset.

After the backup flag 15 is reset in step S3, the boot process is executed as in the conventional system, i.e., the OS initialization process and the application initialization process are executed (steps S4 and S5).

In step S7, it is determined again whether or not the boot mode designated by the boot command is the maintenance mode. In this case, since the boot mode is the maintenance mode, the boot process is completed.

Therefore, the boot process of the present invention can be executed at higher speed than the conventional boot process.

In the computer system according to the first embodiment wherein the main memory data stored in the main memory 12 is saved into the backup memory 13 as the backup data, when the system power source is turned off, the backup data is erased. It is thus necessary to boot the system in the same manner as the conventional apparatus and save the main memory data stored in the main memory 12 into the backup memory 13 as the backup data immediately after the system is booted. By backing up the backup memory 13 by a battery or the like, such boot process in the system is executed only at the first time.

A disk unit 19 of a computer system according to the second embodiment as shown in FIG. 3 can be used in place of the backup memory 13 shown in FIG. 1. The disk unit 19 includes a backup file 23 for storing the main memory data stored in the main memory 12 as backup data and a backup flag 25. Even through the system power source is turned off, the backup data stored in the backup file 23 is not erased. In the system according to the second embodiment, since the backup data as the main memory data is saved and restored between the main memory 12 and disk unit 19, disk access occurs. Therefore, the time required for the boot process of the system according to the first embodiment is longer than the time required for that of the system according to the first embodiment.

Figure 4:
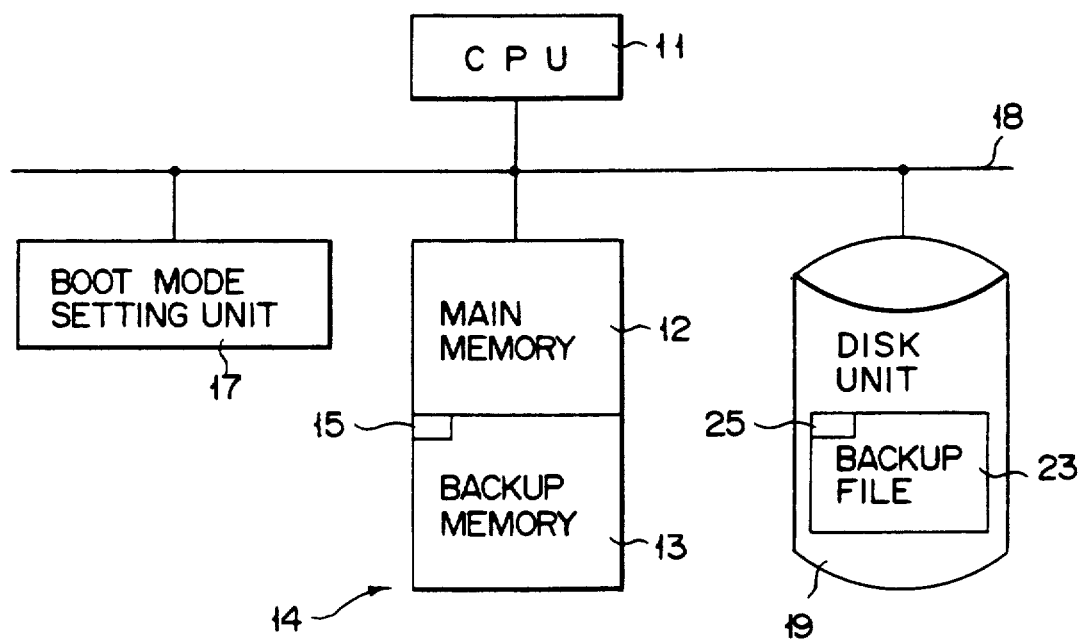
FIG. 4 is a block diagram showing a system according to a third embodiment of the present invention.

In a system according to the third embodiment as shown in FIG. 4, the memory 14 includes the backup memory 13, and the disk unit 19 includes the backup file 23. In the saving mode, therefore, the main memory data stored in the main memory 12 can be saved as backup data into the backup memory 13 and backup file 23, and the backup flags 15 and 25 can be set.

When the system is booted in the normal mode, it is determined in a basis of the backup flag 15 whether or not the backup data can be restored. When the backup flag 15 is set, the main memory data is restored into the main memory 12 by using the backup data stored in the backup memory 13.

When the backup data stored in the backup memory 13 cannot be restored by, for example, turning off the system power source, it is determined in a basis of the backup flag 25 whether or not the backup data can be restored. When the backup flag 25 is set, the main memory data is restored into the main memory 12 by using the backup data stored in the backup file 23.

As described above, according to the present invention, when the system is first booted, the saving mode is selected. Immediately after the system is booted, the main memory data stored in the main memory is saved as backup data into the backup memory (backup file), and the backup flag is set. The system is then rebooted. Therefore, when the system is next booted in the normal mode, the quick start mode is selected and the backup data saved into the backup memory (backup file) is restored as the main memory data in the main memory. The boot process of the system is completed only by the above process, and the state immediately after the system is booted is restored.

In the conventional system, a very large number of times of disk access are necessary for the OS initialization process such as setting of the running environment of an OS and for the application initialization process such as setting of the running environment of an application program, and long time is required for the boot process. In the present invention, however, the system can be booted at high speed.

Since the time required for the boot process of the system of the present invention approximately equals to the time proportionate to the size of the main memory used in the system, the boot process time can be uniformed irrespective of the size of the system.

When software maintenance such as replacement of programs and patch is performed, the boot process is executed in the maintenance mode and thus the backup data cannot be automatically restored. When the system is next booted, the saving mode is selected again. Therefore, the update backup data can always be stored in the backup memory (backup file).

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A method for booting a computer system having a main memory for storing main memory data, a backup memory for storing main memory data as backup data, a boot mode which indicates a normal mode and a maintenance mode, and a flag representing if the backup data can be restored into the main memory as the main memory data, when the flag is set, the backup data can be restored into the main memory as main memory data and when the flag is not set, the backup data cannot be restored as the main memory data into the main memory, comprising the steps of:

determining, by a determination means of the computer system, if the boot mode of the computer system indicates the normal mode or the maintenance mode;

saving, by a savings means of the computer system, the main memory data stored in the main memory in the backup memory when the boot mode indicates the normal mode and the flag is not set; and restoring, by a restoring means of the computer system, the backup data saved in the backup memory into the main memory when the boot mode indicates the normal mode and the flag is set.

2. The method according to claim 1, further comprising the step:

resetting the flag, by a resetting means of the computer system, to the not set state and executing a system initialization process to initialize main memory data stored in the main memory when the boot mode indicates the maintenance mode.

3. The method according to claim 1, further comprising the steps of:

setting the flag, by a setting means of the computer system, after the saving step saves the main memory data in the backup memory when boot mode indicates the normal mode and the flag is not set; and rebooting, by a rebooting means of the computer system, the computer system by restoring the backup data from the backup memory into the main memory.

4. An apparatus for booting a computer system, comprising:

a main memory for storing main memory data;

means for setting a boot mode which indicates a normal mode and a maintenance mode;

a backup memory for storing the main memory data as backup data immediately after the computer system is booted; and a flag, which when set, the backup data can be restored in the main memory as the main memory data and when not set, the backup data cannot be restored into the main memory as the main memory data; and means for restoring the backup data into the main memory as the main memory data when the boot mode indicates the normal mode and the flag is set.

5. The apparatus according to claim 4, further comprising:

a system initialization means for initializing main memory data when the boot mode indicates the normal mode and the flag is not set.

6. The apparatus according to claim 4, wherein the backup memory includes a disk apparatus.

7. The apparatus according to claim 5, further comprising:

a reboot means for rebooting the computer system after the system initialization means initializes the main memory data.

8. The apparatus according to claim 4, further comprising:

flag resetting means for resetting the flag to the not set state when the means for setting the boot mode sets the boot mode to indicate the maintenance mode.

9. The apparatus according to claim 4, further comprising:

means for performing a system initialization process which initializes the main memory data when the means for setting the boot mode sets the boot mode to indicate the maintenance mode.

10. A method for booting a computer system having a main memory for storing main memory data, a backup memory for storing main memory data as backup data, a boot mode which indicates a normal mode and a maintenance mode, and a flag representing if the backup data can be restored into the main memory as the main memory data, when the flag is set, the backup data can be restored into the main memory as main memory data and when the flag is not set, the backup data cannot be restored as the main memory data into the main memory, comprising the steps of:

determining, by a first determining means of the computer system, if the boot mode of the computer indicates the maintenance mode;

determining, by a second determining means of the computer system, if the backup flag is set; and restoring main memory data from the backup memory to the main memory when the first determining means determines that the boot mode does not indicate the maintenance mode and the second determining means determines that the backup flag is set.

11. A method according to claim 10, further comprising the step:

executing, by an executing means of the computer system, an initialization process for initializing the main memory of the computer system, when the first determining means determines that the boot mode indicates the maintenance mode.

12. A method according to claim 11, further comprising the steps:

determining, by a third determining means of the computer system, if the boot mode indicates the maintenance mode, after the initialization process has been executed by the executing means; and saving, by a saving means of the computer system, the main memory data into backup memory after the third determining means determines that the boot mode does not indicate the maintenance mode.

13. A method according to claim 12, further comprising the step:
setting, by a setting means of the computer system, the backup flag after the backup memory was saved to the main memory by the saving means.

* * * * *